United States Patent
Müller

(10) Patent No.: US 6,624,362 B2
(45) Date of Patent: Sep. 23, 2003

(54) ELECTRONICALLY DETECTABLE RESONANCE LABEL, IN PARTICULAR RFID LABEL

(75) Inventor: Philipp Müller, Greifensee (CH)

(73) Assignee: Lucatron AG, Baar (CH)

( * ) Notice: Subject to any disclaimer, the term of this patent is extended or adjusted under 35 U.S.C. 154(b) by 24 days.

(21) Appl. No.: 09/796,740

(22) Filed: Mar. 2, 2001

(65) Prior Publication Data

US 2002/0067602 A1 Jun. 6, 2002

(30) Foreign Application Priority Data

Mar. 2, 2000 (CH) .............................................. 0406/00

(51) Int. Cl.[7] .......................... H01R 12/04; H05K 1/11
(52) U.S. Cl. ..................................... 174/261; 174/26 D
(58) Field of Search ................................ 174/261, 260; 361/763, 761

(56) References Cited

U.S. PATENT DOCUMENTS

| | | | | |
|---|---|---|---|---|
| 6,097,622 A | * | 8/2000 | Shimizu et al. | 365/145 |
| 6,107,920 A | * | 8/2000 | Eberhardt et al. | 340/572.7 |
| 6,133,835 A | * | 10/2000 | De Leeuw et al. | 340/572.5 |
| 6,303,958 B1 | * | 10/2001 | Kanaya et al. | 257/310 |

FOREIGN PATENT DOCUMENTS

| | | |
|---|---|---|
| DE | 296 22 334 | 12/1996 |
| EP | 0 380426 | 1/1990 |
| FR | 2 701 146 | 2/1993 |
| WO | WO 97/41543 | 11/1997 |

* cited by examiner

Primary Examiner—Albert W. Paladini
Assistant Examiner—Jeremy Norris
(74) Attorney, Agent, or Firm—Morgan, Lewis & Bockius LLP

(57) ABSTRACT

An electronically detectable resonance label, in particular an RFID label, includes a substrate made of plastic foil and conductive surfaces on the front and rear of the substrate. Some of the conductive surfaces form a capacitor in a mutual area of overlap. The label includes a first capacitor plate on the front of the substrate and a second capacitor plate on the rear of the substrate. The capacitor plates are in the shape of elongated strips of uniform width along their entire length. The capacitor plates only partially overlap, and the area of overlap is arranged at a distance from both ends of at least one capacitor plate. This provides the advantage that during the production process relative displacement of the capacitor plates can take place in two directions.

2 Claims, 2 Drawing Sheets

ELECTRONICALLY DETECTABLE RESONANCE LABEL, IN PARTICULAR RFID LABEL

TECHNICAL FIELD

The present invention relates to an electronically detectable resonance label, in particular an RFID label, with a substrate made of plastic foil and with conductive surfaces on the front and rear of the substrate, with some of the conductive surfaces forming a capacitor in a mutual area of overlap, comprising a first capacitor plate on the front of the substrate and a second capacitor plate on the rear of the substrate.

STATE OF THE ART

Such resonance labels are well known, as can be seen for example from WO 89/05984. The known labels are made in a continuous process, using runs of metal-coated plastic foil, with the pattern of the conductive tracks being generated on both sides of the substrate by using etching technology, and prior to etching being deposited with photo technology. It is understood that both on the front and rear of the foil run, the conductive tracks have to be aligned in a certain position in relation to each other.

PRESENTATION OF THE INVENTION

It is the object of the present invention as characterised in the claims, in the case of resonance labels of the type mentioned in the introduction, to ensure that the capacitor always has the same capacity, even if during the production process, the conductive tracks on the front and the rear of the substrate are somewhat offset in relation to each other. According to the invention, this object is met in that the capacitor plates are in the shape of elongated strips of uniform width along their entire length; in that they only partially overlap; and in that the area of overlap is arranged at a distance from both ends of at least one capacitor plate Preferably, the area of overlap is arranged at a distance from both ends of both capacitor plates. In this way, there is the possibility of relative displacement in two directions.

BRIEF EXPLANATION OF THE FIGURES

Below, the invention is explained in more detail by means of embodiments in conjunction with the drawing. The following are shown.

WAYS TO IMPLEMENT THE INVENTION

Figure 1:
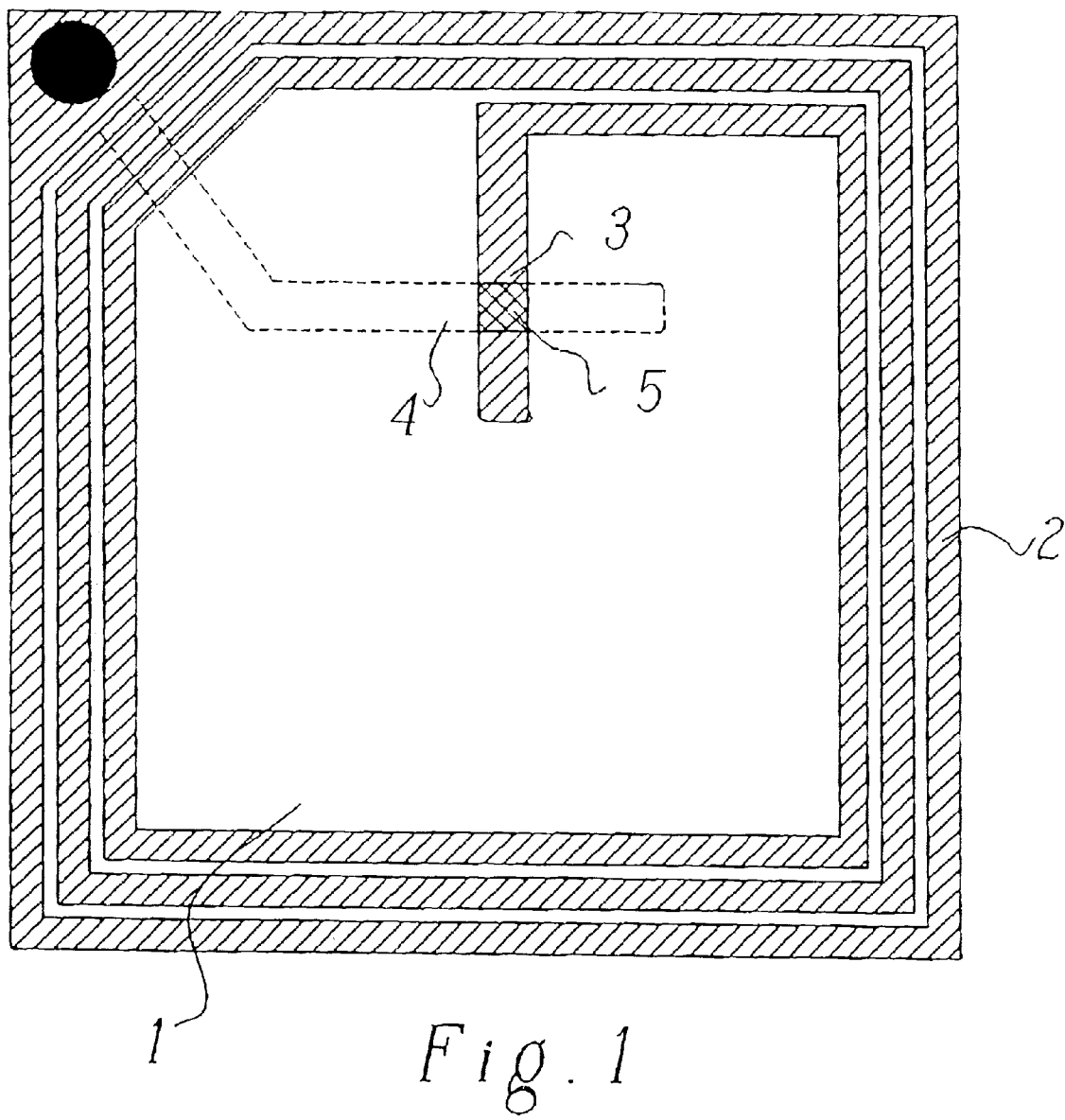
FIG. 1 a top view of a simple resonance label.

FIG. 1 shows a plastic foil 1 with a turn of the coil 2 having been applied to its front. The conductive track 3 on the front forms a first capacitor plate and the conductive track 4 on the rear of the plastic foil forms a second capacitor plate in the area of overlap 5. If during the production process a conductive track is by mistake offset in horizontal or vertical direction relative to the other conductive track, the size of the surface of the area of overlap 5 remains the same. The widths of the two conductive tracks 3, 4 remain constant along their entire length. This prevents any change of the surface of the area of overlap 5 if one of the conductive tracks is displaced during the production process, This means that no change in capacity can occur due to displacement of one or both conductive tracks. As a result of this arrangement of the conductive tracks 3, 4, it is possible to create a very high tolerance range during the production of such capacitors on resonance labels.

Figure 2:
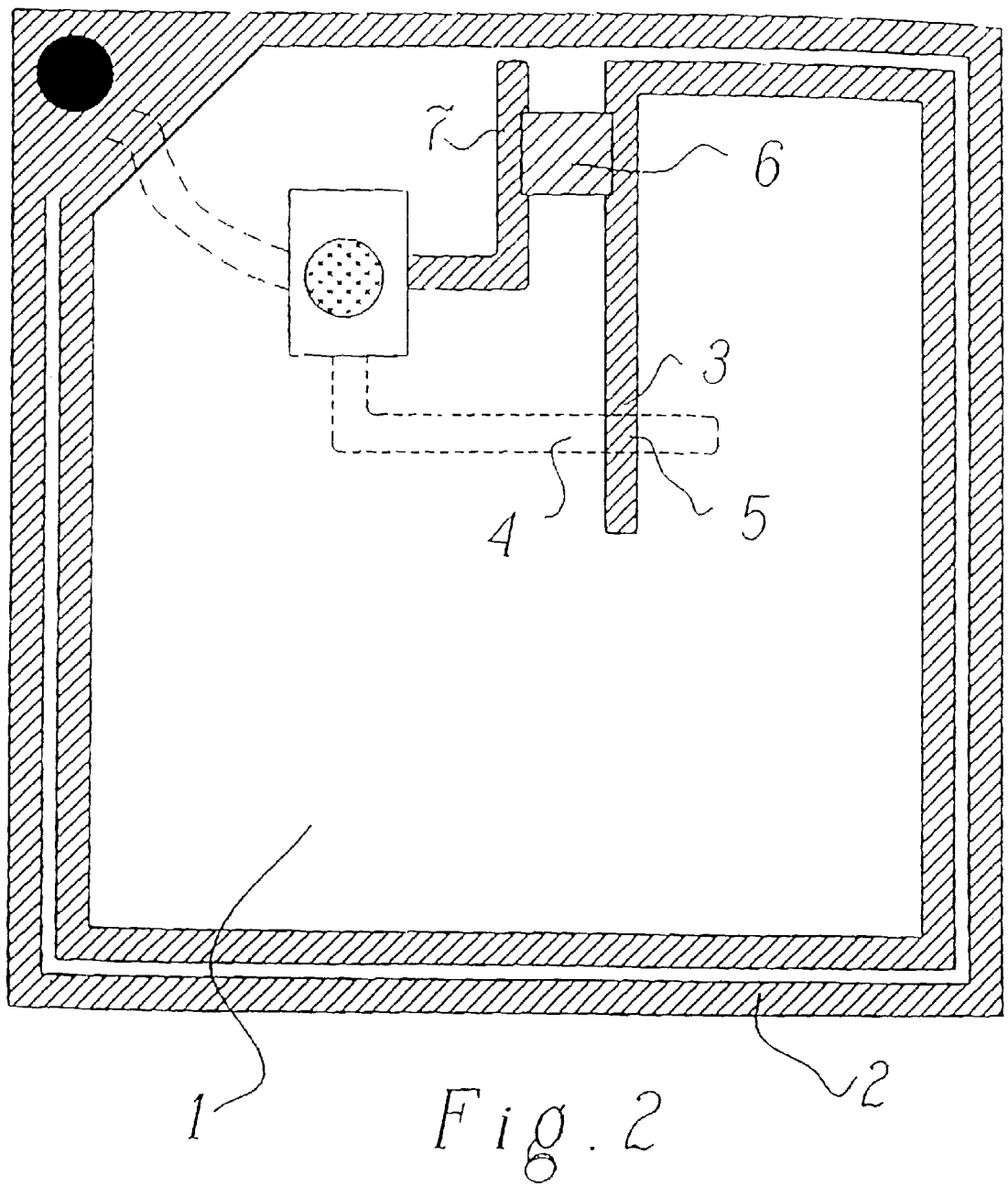
FIG. 2 a top view on an RFID label.

FIG. 2 shows an RFID label with a chip 6 between two conductive surfaces 3, 7 on the front of the plastic foil. With this embodiment too, there is a possibility for relative movement of the capacitor plates 3, 4.

LIST OF REFERENCES

| | |
|---|---|
| 1 | Plastic foil |
| 2 | Turn of the coil |
| 3 | Conductive track (front) |
| 4 | Conductive track (rear) |
| 5 | Area of overlap |
| 6 | Chip |
| 7 | Conductive surface on the front of the plastic foil |

What is claimed is:

1. An electronically detectable resonance label, in particular an RFID label, with a substrate made of plastic foil (1) and with conductive surfaces on the front and rear of the substrate, with some of the conductive surfaces forming a capacitor in a mutual area (5) of overlap, comprising a first capacitor plate (3) on the front of the substrate and a second capacitor plate (4) on the rear of the substrate, characterised in that the capacitor plates are in the shape of elongated strips of uniform width along their entire length; in that they only partially overlap; and in that the area of overlap (5) is arranged at a distance from both ends of at least one capacitor plate.

2. An electronically detectable resonance label according to claim 1, characterised in that the area (5) of overlap is arranged at a distance from both ends of both capacitor plates.

* * * * *